United States Patent
Shah

(10) Patent No.: US 7,266,960 B2
(45) Date of Patent: Sep. 11, 2007

(54) SINGLE INTEGRATED HUMIDITY AND VENTILATION CONTROL IN AN HVAC SYSTEM

(75) Inventor: Rajendra K. Shah, Indianapolis, IN (US)

(73) Assignee: Carrier Corporation, Syracuse, NY (US)

( * ) Notice: Subject to any disclaimer, the term of this patent is extended or adjusted under 35 U.S.C. 154(b) by 181 days.

(21) Appl. No.: 11/034,169

(22) Filed: Jan. 12, 2005

(65) Prior Publication Data

US 2005/0155363 A1    Jul. 21, 2005

Related U.S. Application Data

(60) Provisional application No. 60/537,528, filed on Jan. 20, 2004.

(51) Int. Cl.
*F25B 29/00* (2006.01)
*F25B 49/00* (2006.01)
*F25D 17/04* (2006.01)

(52) U.S. Cl. .................. 62/176.6; 62/44 C; 62/186

(58) Field of Classification Search ............. 62/176.6, 62/186, 173, 93, 150, 180; 236/44 C, 44 A
See application file for complete search history.

(56) References Cited

U.S. PATENT DOCUMENTS

| 4,414,818 | A | * | 11/1983 | Turbard et al. | ............ | 62/176.1 |
| 4,517,810 | A | * | 5/1985 | Foley et al. | .................. | 62/186 |
| 5,348,077 | A | * | 9/1994 | Hillman | ...................... | 165/249 |
| 6,427,454 | B1 | * | 8/2002 | West | .............................. | 62/93 |

* cited by examiner

*Primary Examiner*—Chen Wen Jiang
(74) *Attorney, Agent, or Firm*—Carlson, Gaskey & Olds

(57) ABSTRACT

HVAC systems are employed to control the indoor environmental characteristics of a building structure to make it comfortable for its inhabitants. An HVAC system includes one single integrated central control to regulate an indoor temperature level, an indoor relative humidity level and an indoor fresh air level of a building structure during both a heating season and a cooling season. Further, the single integrated central control is operable to selectively activate/deactivate an indoor blower to control a sensible ratio within a building structure. In addition, a protection feature for avoiding condensation on the interior surfaces of the building structure is included as an user selectable option.

16 Claims, 6 Drawing Sheets

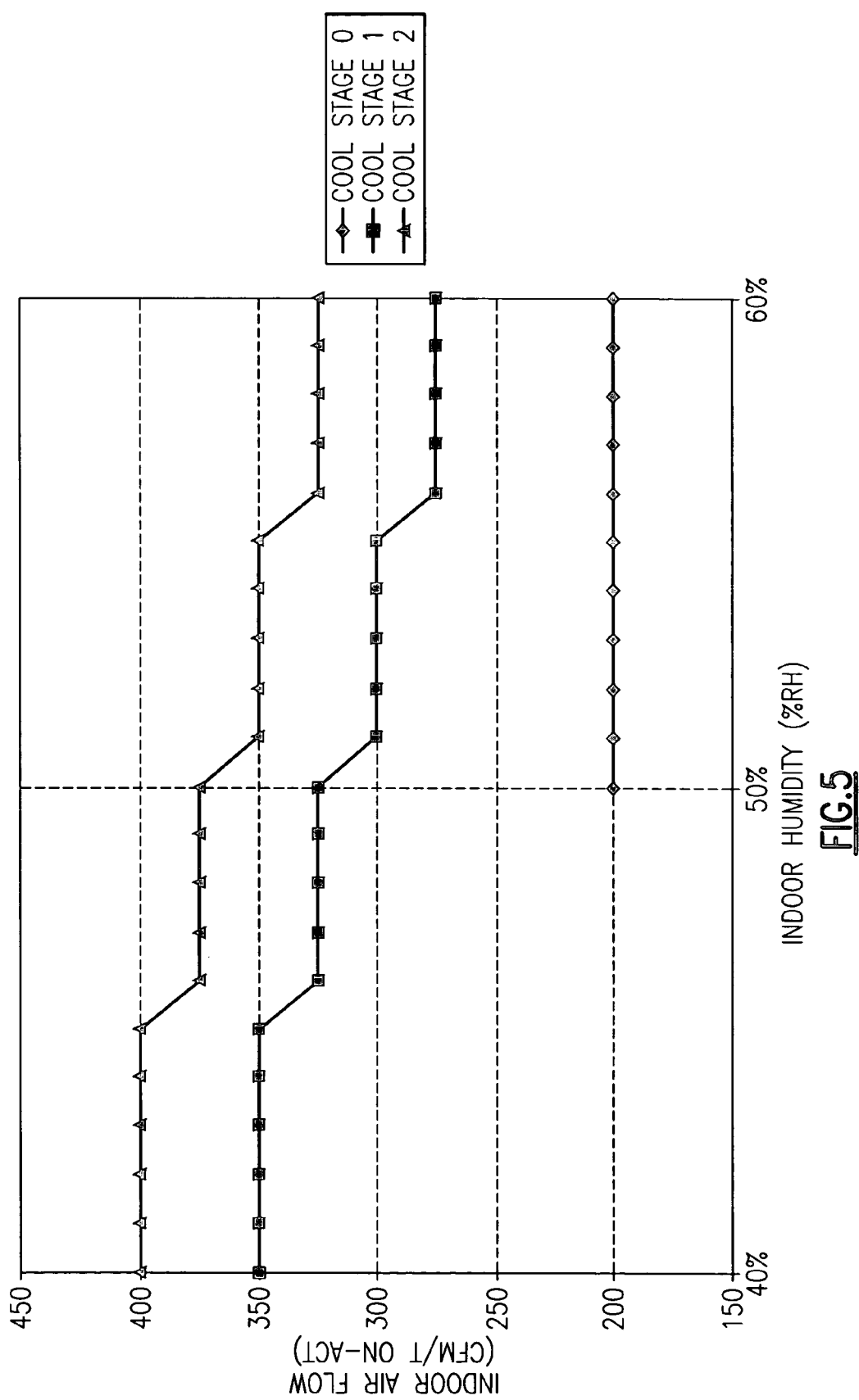

ALLOWABLE HUMIDITY
VS DELTA T.

ALLOWABLE HUMIDITY

| DELTA T | RH % | DELTA T | RH % |
|---|---|---|---|
| 75 | 4% | 27 | 37% |
| 74 | 4% | 26 | 39% |
| 73 | 4% | 25 | 40% |
| 72 | 5% | 24 | 42% |
| 71 | 5% | 23 | 44% |
| 70 | 5% | 22 | 45% |
| 69 | 6% | 21 | 47% |
| 68 | 6% | 20 | 49% |
| 67 | 6% | 19 | 51% |
| 66 | 6% | 18 | 53% |
| 65 | 7% | 17 | 55% |
| 64 | 7% | 16 | 57% |
| 63 | 7% | 15 | 59% |
| 62 | 8% | 14 | 61% |
| 61 | 8% | 13 | 63% |
| 60 | 9% | 12 | 65% |
| 59 | 9% | 11 | 68% |
| 58 | 10% | 10 | 70% |
| 57 | 10% | | |
| 56 | 11% | | |
| 55 | 11% | | |
| 54 | 12% | | |
| 53 | 12% | | |
| 52 | 13% | | |
| 51 | 13% | | |
| 50 | 14% | | |
| 49 | 15% | | |
| 48 | 16% | | |
| 47 | 16% | | |
| 46 | 17% | | |
| 45 | 18% | | |
| 44 | 19% | | |
| 43 | 20% | | |
| 42 | 21% | | |
| 41 | 22% | | |
| 40 | 22% | | |
| 39 | 23% | | |
| 38 | 24% | | |
| 37 | 25% | | |
| 36 | 26% | | |
| 35 | 27% | | |
| 34 | 29% | | |
| 33 | 30% | | |
| 32 | 31% | | |
| 31 | 32% | | |
| 30 | 33% | | |
| 29 | 35% | | |
| 28 | 36% | | |

FIG.7

SINGLE INTEGRATED HUMIDITY AND VENTILATION CONTROL IN AN HVAC SYSTEM

The application claims priority to U.S. Provisional Application No. 60/537,528 which was filed on Jan. 20, 2004, the disclosure of which is incorporated in its entirety herein by reference.

BACKGROUND OF THE INVENTION

This application relates to an indoor central heating, ventilation, and air conditioning (HVAC) system wherein control of an indoor temperature level, an indoor relative humidity level, and an indoor fresh air level are combined into one single integrated central control that is operable to manage an indoor environment during both a heating season and a cooling season.

HVAC systems are employed to control the indoor environmental characteristics of a building structure to make it comfortable for its inhabitants. A typical HVAC system includes a temperature control device or thermostat and one or more humidity control devices known as humidistats.

A thermostat is employed as a control device to regulate the indoor temperature level. Thermostats sense an actual indoor temperature and allow a user to input a desired indoor temperature. When the indoor temperature deviates from the desired level, the thermostat operates to selectively activate and deactivate a heating unit and/or an air conditioning unit and their associated blower to achieve the user desired setting.

In addition to temperature control, in order to provide a comfortable indoor environment, regulation of the indoor relative humidity of a building is also often provided. Relative humidity is defined as the ratio of the actual amount of moisture in the air to the maximum moisture capacity at a given air temperature. It is known that as temperature increases, the capacity of the air to hold moisture in the form of water vapor also increases. Conversely, as temperature decreases, the capacity of the air to hold moisture decreases and any excess moisture condenses as water on surfaces in contact with the air.

Therefore, during the winter months, the cold outdoor air has a relatively low moisture content, however, the air inside building structures is typically heated. Depending on the construction quality of a particular building, some of the cold dry outside air infiltrates into the warm indoor space and is subsequently heated to the indoor temperature. This phenomenon effectively reduces the indoor relative humidity and the indoor air becomes very dry.

To address this winter dryness or low indoor relative humidity, humidifiers are often employed as part of the central heating system. Humidifiers introduce moisture into the heated air increasing indoor relative humidity and are typically controlled by a second control device known as a humidistat. Humidistats sense an actual indoor relative humidity and allow a user to set a desired indoor relative humidity level. When the indoor relative humidity falls below the desired level the humidistat activates the humidifier to add moisture to the air. Once the desired indoor relative humidity is achieved, the humidistat deactivates the humidifier.

Conversely, to address the concern of high indoor relative humidity, devices known as ventilators are often employed. Once the indoor relative humidity exceeds the desired level the ventilator is activated to bring a controlled amount of outside dry air into the building envelope to decrease the indoor relative humidity. In addition, ventilators are also employed to bring in controlled amounts of fresh outside air to improve indoor air quality. Ventilators are typically controlled by a humidistat. However, the humidistat that controls the ventilator is typically separate from and in addition to the humidistat that controls the humidifier.

While it is known to combine temperature control and humidifier control into a single control, e.g. a thermidistat, the incorporation of a ventilator typically requires the addition of a second separate humidistat control. As such, providing year round control over all of the indoor environmental characteristics of a building structure requires the user to interface with at least two control devices to control different functions of the same HVAC system. This can be confusing for the user. Furthermore, requiring multiple control devices to control functions of the same HVAC system may at times produce conflicting results causing the system to operate at a less than optimum performance level.

In sum, to date controlling indoor environmental characteristics, such as: indoor temperature, indoor relative humidity, and indoor fresh air levels, has required the use of multiple control devices which is undesirable. As such, it is desirable to have a HVAC system which integrates control of temperature, humidity and ventilation into one single integrated central control.

SUMMARY OF THE INVENTION

A single integrated central control is disclosed in the present invention. The single integrated central control has access to various actual environmental characteristics such as: indoor temperature, indoor relative humidity, and outdoor temperature which are communicated to the single integrated central control via various sensors.

In one disclosed embodiment, a single integrated central control has an input structure for a user to input desired indoor environmental characteristics, such as: a user desired indoor temperature during heating, a user desired indoor temperature during cooling, a user desired indoor relative humidity during heating, a user desired indoor relative humidity during cooling, and/or a desired indoor fresh air level. Based on the various actual environmental inputs and the user desired inputs, the single integrated central control provides integrated centralized control of the heating and air conditioning system, including an associated blower, a humidifier, and a ventilator to achieve the user desired indoor environmental characteristics.

In the heating season, i.e. when the outdoor temperature drops below the user desired indoor temperature, the air inside a building structure has a tendency to become dry, i.e. the indoor relative humidity is low. Under this circumstance, in addition to controlling the actual indoor temperature to a user desired indoor heating temperature, the single integrated central control operates to actively humidify the indoor air. Active humidification includes balancing the activation and the deactivation of both a humidifier and/or a ventilator. When the actual indoor relative humidity is below a user desired indoor relative heating humidity, which is typically the case in the heating season, the humidifier is activated to add moisture to the air, actively increasing an actual indoor relative humidity. Conversely, when the actual indoor relative humidity exceeds the user desired indoor relative heating humidity, the ventilator is activated to bring cool, dry fresh outdoor air inside the building structure, effectively decreasing the actual indoor relative humidity.

In the cooling season, i.e. when the outdoor temperature exceeds the user desired indoor temperature, the air inside the building structure has a tendency to become wet or humid, i.e. the indoor relative humidity is high. Under this circumstance, in addition to controlling the actual indoor temperature, the single integrated central control operates to actively dehumidify the indoor air. Active dehumidification includes regulating the temperature of the output air created by an air conditioner and the level of airflow generated by a blower associated with the air conditioner. When the actual indoor relative humidity exceeds a user desired indoor relative cooling humidity, which is typically the case in the cooling season, the single integrated central control adjusts the temperature of the air conditioner to a level below the user desired indoor cooling temperature setting and decreases the airflow created by the blower associated with the air conditioner This effectively maintains an actual indoor temperature proximate to the user desired indoor cooling temperature while decreasing the actual indoor relative humidity. Conversely, when the actual indoor relative humidity is below the user desired indoor relative cooling humidity, the ventilator is activated to bring warm, wet fresh outdoor air inside the building structure, effectively increasing the actual indoor relative humidity.

In addition, in the cooling season, the single integrated central control modulates indoor airflow by selectively regulating the blower, effectively controlling an indoor sensible ratio (i.e., balancing the cooling or sensible demand with the dehumidification or latent demand). By modulating the indoor airflow, the air conditioning unit can deliver different proportions of sensible and latent capacities to the indoor space. Therefore, if there is a high sensible demand (indoor temperature is difficult to maintain) but there is no latent demand (humidity is below the desired level), the indoor airflow is increased to increase the sensible ratio of the delivered air conditioning capacity. Conversely, when there is little to no cooling demand but the humidity is above the desired level, the indoor airflow is reduced to lower the sensible ratio.

In another disclosed embodiment, the single integrated central control includes, at the user's option, a protection feature for avoiding condensation on the interior surfaces of a building, as disclosed in the commonly assigned, co-pending application entitled "Determination of Maximum Allowable Humidity in Indoor Space to Avoid Condensation Inside Building Envelope," U.S. patent application Ser. No. 11/016,373 filed on Dec. 17, 2004, the disclosure of which is incorporated in its entirety herein by reference. This option provides automatic adjustment of the desired indoor relative humidity to prevent condensation on the interior surfaces of the building based on actual indoor and outdoor characteristics.

In this embodiment, the user input is a user selectable heating humidity level entered by the building owner/occupant. The occupant selects a heating humidity level from a predetermined range of 1-9 with a default value somewhere in the middle, say 5. The selected heating humidity level is subsequently employed to determine the single adjustment factor (A*). In this embodiment, the central control employs a conversion table stored in memory to convert the user selected heating humidity level to the single adjustment factor (A*). The single adjustment factor (A*) is then employed to calculate the maximum allowable indoor relative humidity based upon the user selected heating humidity level.

The occupant typically sets the heating humidity level to a level just below the one that allows condensation to occur. This is accomplished through an iterative process. The occupant selectively increases the heating humidity level until condensation occurs within the building envelope. The occupant then selectively decreases the heating humidity to the level just below the level at which condensation occurred. Once the occupant has selected the indoor relative humidity level required to prevent condensation, the central control is operable to maintain the actual indoor relative humidity based upon the user selected indoor relative humidity level, continuously adjusting the actual indoor relative humidity to accommodate changing environmental conditions while preventing condensation.

In yet another disclosed embodiment of this invention, the user input is entered by the HVAC system installer upon installation. The user input is representative of a building structural characteristic and is typically indicative of a thermal insulation level of the building envelope. The user input may be set based on past experience of the installer with respect to previous homes of similar quality. In this embodiment, the central control employs a conversion table to subsequently convert the structural characteristic into the aforementioned single adjustment factor (A*). The single adjustment factor (A*) is then employed to calculate the maximum allowable indoor relative humidity based upon the thermal insulation level of the building. Once set by the installer, the HVAC system is operable to maintain the actual indoor relative humidity level, continually adjusting to accommodate changing environmental conditions to prevent condensation.

These and other features of the present invention can be best understood from the following specification and drawings, the following of which is a brief description.

BRIEF DESCRIPTION OF THE DRAWINGS

FIG. 5 is a graphical illustration of an active dehumidification in a cooling mode of an integrated central control unit.

FIG. 7 is an example Allowable Humidity Table.

DETAILED DESCRIPTION OF THE PREFERRED EMBODIMENT

Figure 1:
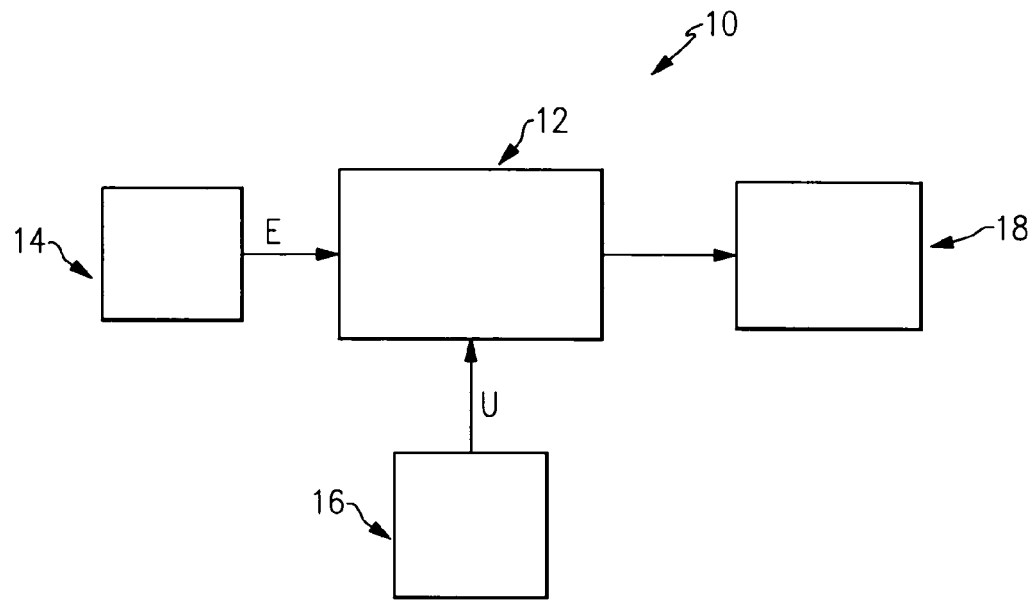
FIG. 1 is a schematic view of a building HVAC system.

A schematic view of a building HVAC system 10 is illustrated in FIG. 1. A single integrated central control unit 12 is operable to manipulate a multiple of indoor environmental characteristics based upon actual environmental characteristics E sensed by at least one environmental sensor 14 and user input U entered by a user into a user interface 16. The single integrated central control unit 12 manipulates the indoor environmental characteristics by selectively activating and/or deactivating at least one device 18.

Figure 2:
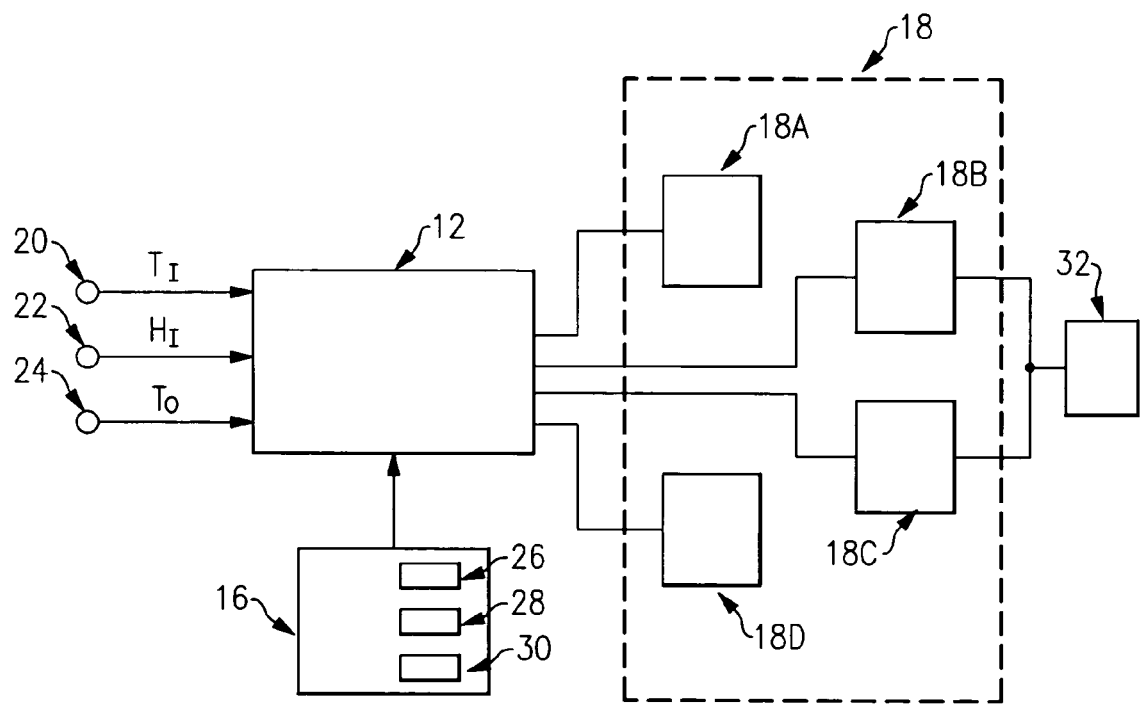
FIG. 2 is a detailed schematic view of a building HVAC system including an integrated central control for controlling a furnace, an air conditioner, a humidifier, and a ventilator, and a blower.

A detailed schematic view of a building HVAC system including a single integrated central control unit 12 is illustrated in FIG. 2. The single integrated central control unit 12 receives actual environmental input from a plurality of sensors. An indoor temperature sensor 20, an indoor relative humidity sensor 22, and an outdoor temperature sensor 24 are operable to transmit an actual indoor temperature input ($T_I$), an indoor relative humidity input ($H_I$), and an actual outdoor temperature ($T_O$) to the single integrated central control unit 12. User interface 16 is operable to receive user input. A user inputs user desired indoor temperature levels 26, including a user desired indoor heating temperature level and a user desired indoor cooling temperature level, user desired indoor relative humidity levels 28, including a user desired heating humidity level 28A (FIG. 3) and a user desired cooling humidity level 28B (FIG. 3), and a user desired fresh air level 30.

The user interface 16 transmits the user desired settings to the single integrated central control unit 12. Based upon a comparison of the user desired settings received from the user interface 16 to the actual environmental inputs received from the plurality of sensors, the single integrated central control unit 12 is operable to selectively activate and/or deactivate at least one device 18 to manipulate an actual indoor temperature level, an actual indoor relative humidity level and an actual indoor fresh air level to achieve the user desired settings. In the illustrated embodiment, the at least one device 18 includes a furnace 18A, an air conditioner 18B, a humidifier 18C, a ventilator 18D, and a blower 32 associated with both the furnace 18A and the air conditioner 18B, all of which are controlled by the single integrated central control unit 12.

The single integrated control unit 12 operates in a heating mode or a cooling mode based upon a comparison of an actual indoor temperature ($T_I$) sensed by the indoor temperature sensor 20 and an actual outdoor temperature ($T_O$) sensed by the outdoor temperature sensor 24. The user inputs the user desired indoor temperature levels 26, the user desired indoor relative heating humidity level 28A, and the user desired indoor relative cooling humidity level 28B. When the actual indoor temperature ($T_I$) is less than the actual outside temperature ($T_O$), the single integrated central control unit 12 will operate in the heating mode. Conversely, when the actual indoor temperature ($T_I$) is greater than the actual outdoor temperature ($T_O$), the single integrated central control unit 12 will operate in the cooling mode.

In the heating mode, also known as the active humidification mode, the single integrated central control unit 12 is operable to regulate the furnace 18A, including the associated blower 32, as required to achieve the user desired indoor heating temperature level. The humidifier 18C and the ventilator 18D are also regulated as required to achieve the user desired heating indoor relative humidity level 28B and the user desired indoor fresh air level 30.

The single integrated central control unit 12 receives input from the actual indoor temperature sensor 20, the actual indoor relative humidity sensor 22, and the user. The user inputs include the user desired indoor heating temperature, the user desired indoor heating humidity level 28A and the user desired indoor fresh air level. The single integrated central control unit 12 compares an actual indoor relative humidity ($H_I$) with the user desired indoor heating humidity level 28A. If the actual indoor relative humidity ($H_I$) is below the user desired indoor relative heating humidity level 28A, which is typically the case during the heating season, the single integrated central control unit 12 selectively activates the humidifier 18C to increase the actual indoor relative humidity ($H_I$) to a value proximate to the user desired indoor relative heating humidity level 28A. If the actual indoor relative humidity ($H_I$) exceeds the user desired indoor relative heating humidity level 28A, the single integrated central control unit 12 selectively activates the ventilator 18D to bring cool, dry fresh outdoor air into the building structure, effectively reducing the actual indoor relative humidity ($H_I$) to a value proximate to the user desire indoor relative heating humidity level 28A.

Figure 4:
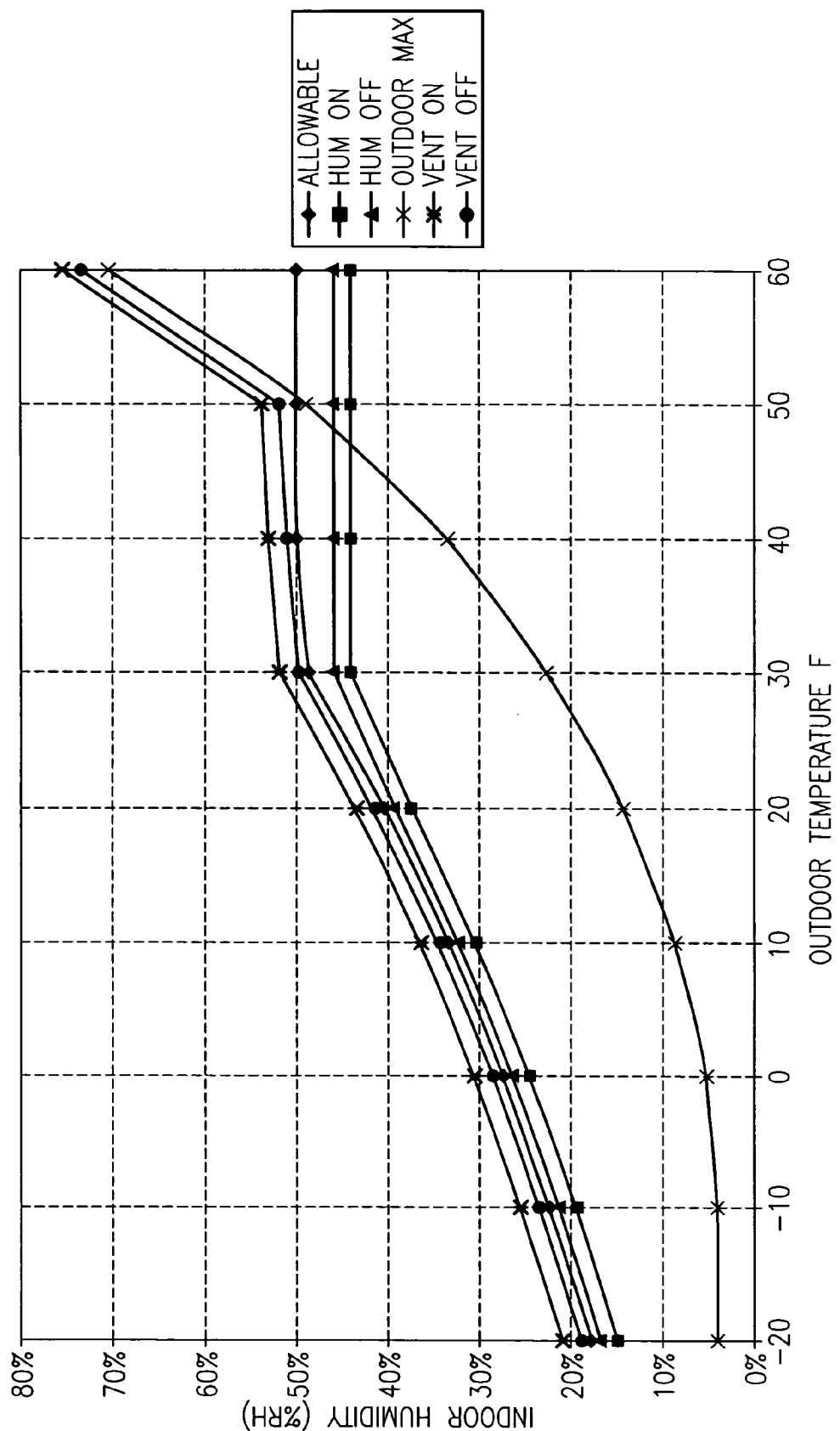
FIG. 4 is a graphical illustration of an active humidification in a heating mode of an integrated central control unit.

A graphical illustration of active humidification during the heating mode is shown as FIG. 4.

In the cooling mode, also known as the active dehumidification mode, the single integrated central control unit 12 is operable to regulate the air conditioner 18B including the associated blower 32, the humidifier 18C, and the ventilator 18C as required to achieve the user desired indoor cooling temperature level and the user desired indoor cooling humidity level 28B and the user desired indoor fresh air level 30.

The single integrated central control unit 12 receives input from the actual indoor temperature sensor 20, the actual indoor relative humidity sensor 22, and the user. The user inputs include the user desired indoor cooling temperature, the user desired indoor cooling humidity level 28B and the user desired indoor fresh air level. The single integrated central control unit 12 compares an actual indoor relative humidity ($H_I$) with the user desired indoor cooling humidity level 28B. The actual indoor relative humidity ($H_I$) may exceed the user desired indoor relative cooling humidity level 28B; this is typically the case during the cooling season. The single integrated central control unit 12 then selectively regulates the temperature of the output air created by the air conditioner 18B to a level below that of the user desired indoor cooling temperature and reduces the airflow generated by the associated blower 32. This will decrease the actual indoor relative humidity ($H_I$) to a value proximate to the user desired indoor relative cooling humidity level 28B. If the actual indoor relative humidity ($H_I$) is below the user desired indoor relative cooling humidity level 28B, the single integrated central control unit 12 selectively activates the ventilator 18D to bring warm, wet fresh outdoor air into the building structure. This effectively increases the actual indoor relative humidity ($H_I$) to a value proximate to the user desire indoor relative cooling humidity level 28B.

Further, when operating in the cooling mode, the single integrated central control unit 12 is operable to modulate the airflow of the blower 32 to balance the cooling (sensible) demand with the dehumidification (latent) demand. When there is a high sensible demand (user desired indoor temperature is hard to maintain) but there is no latent demand (actual indoor relative humidity is below user desired indoor relative humidity) the single integrated central control unit 12 regulates the blower 32 to increase the sensible ratio of the delivered air conditioning capacity. Conversely, when there is little to no cooling demand (actual indoor temperature is at or slightly below the user desired indoor temperature) but the actual indoor relative humidity is higher than the user desired indoor relative humidity, the blower is regulated to decrease the sensible ratio.

A graphical illustration of the active dehumidification of the cooling mode is shown as FIG. 5.

Therefore, when the single integrated central control unit 12 is operating in the heating mode, all environmental manipulations are calculated based upon the user desired indoor heating temperature and the user desired indoor relative heating humidity level 28A. Conversely, when the single integrated central control unit 12 is operating in the cooling mode, all environmental manipulations are calculated based upon the user desired indoor cooling temperature and the user desired indoor relative cooling humidity level 28B. As such, the single integrated central control unit 12 is operable to control all devices 18 required to achieve the user desire indoor environmental conditions during both the heating season and the cooling season.

Figures 3, 6:
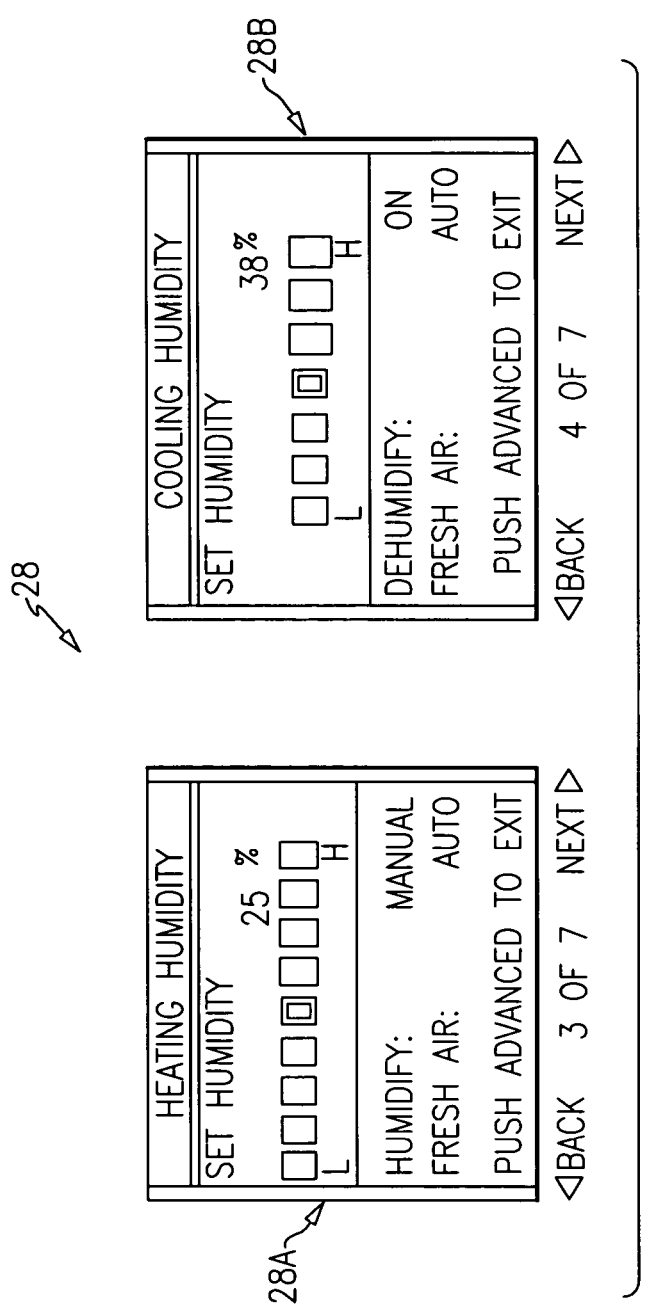
FIG. 3 is a detailed view of an example indoor relative humidity input.
FIG. 6 is an example Conversion Table.

FIG. 3 illustrates an example screen of a user interface 16 where a user inputs a user desired indoor relative humidity input 28. The user inputs a desired heating indoor relative humidity level 28A and a desired cooling indoor relative humidity level 28B into the user interface 16 (FIG. 2). The user interface 16 then transmits the user inputs to the single integrated central control unit 12. Of course, this is only one example screen of the user interface 16. Different screens can be available for the user to input other types of input, for example, user desired indoor heating temperature, user desired indoor cooling temperature and user desired fresh air levels.

Also included, at the user's option, is a protection feature for avoiding condensation on the interior surfaces of the building structure. This feature is disclosed in the commonly assigned, co-pending application entitled "Determination of Maximum Allowable Humidity in Indoor Space to Avoid Condensation Inside Building Envelope," U.S. patent application Ser. No. 11/016,373, filed on Dec. 17, 2004, the disclosure of which is incorporated in its entirety herein by reference. In this option, the single integrated central control unit 12 calculates a maximum allowable indoor relativity based on indoor and outdoor environmental characteristics to prevent condensation and adjusts the actual indoor relative humidity accordingly to prevent condensation.

In this embodiment, the single integrated central control unit 12 employs a Conversion Table (CT), illustrated in FIG. 6, to convert information entered by either the homeowner or system installer into the user interface 16 into an adjustment factor A*. After conversion, the single integrated central control 12 then calculates an effective delta ΔT based upon the formula:

$$\Delta T = A^*(t_2 - t_1)$$

After calculating the effective delta ΔT, the single integrated central control 12 employs an Allowable Humidity Table (AHT), illustrated in FIG. 7, to determine a maximum allowable indoor relative humidity. Of course, other ways of determining a reference value to compare to such a table come within the scope of this invention. Any method of utilizing a user input and an environmental input to determine a value reference to be compared to a table comes within the scope of this invention.

After determining the maximum allowable indoor relative humidity, the single integrated central control unit 12 is operable to selectively activate/deactivate indoor device 18 to adjust an actual indoor relative humidity to a value less than the calculated maximum allowable indoor relative humidity to prevent condensation.

Figure 8:
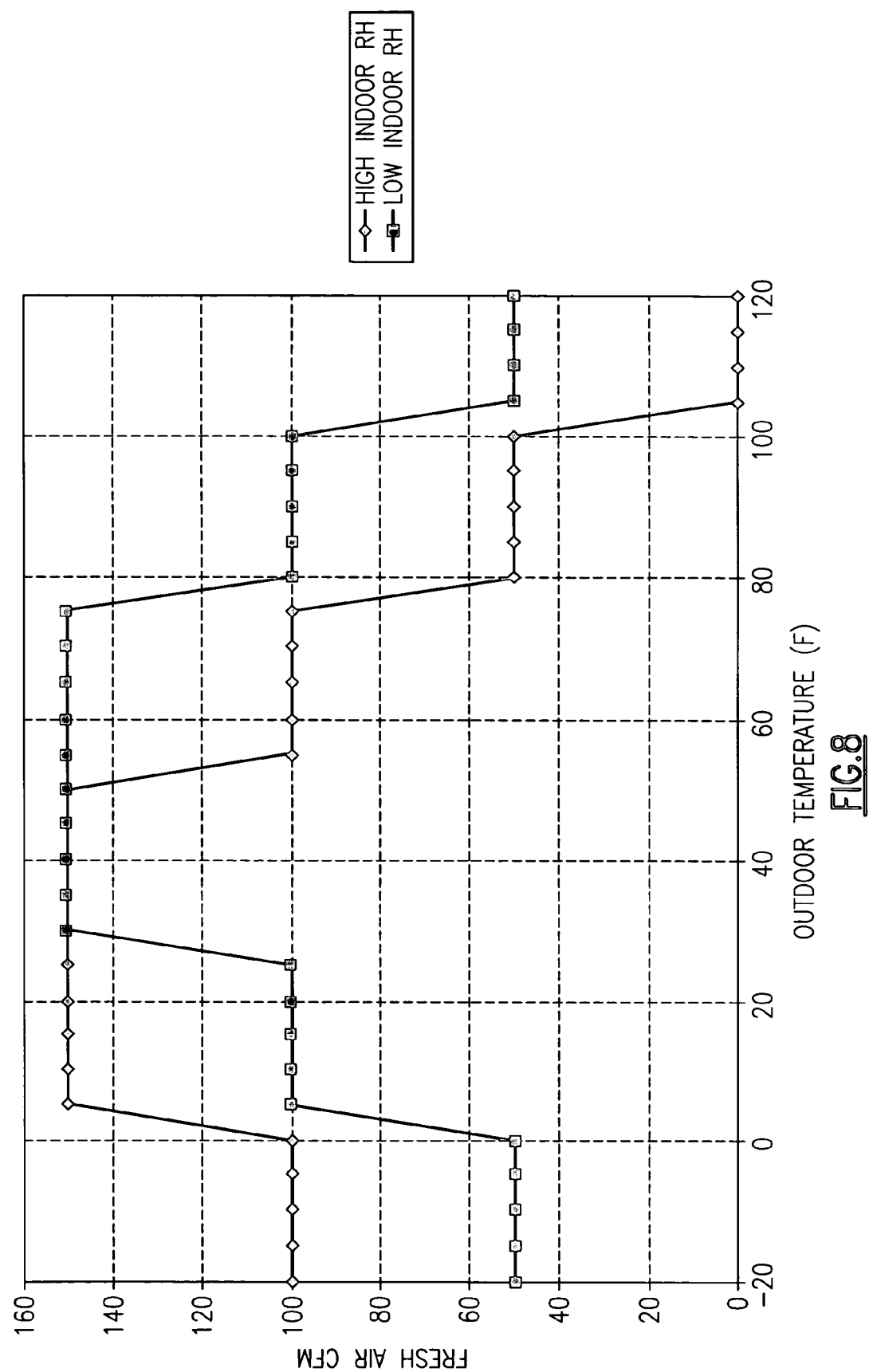
FIG. 8 is a graphical illustration of a fresh air control of an integrated central control unit.

When this option is activated, at colder outdoor temperatures, the single integrated central control unit 12 increases the intake of fresh air from the ventilator 18D to reduce the actual indoor relative humidity when required to achieve the desired or maximum allowable indoor relative humidity levels. The single integrated central control unit 12 is operable to bring in fresh air to achieve the user desired fresh air level but limits or stops fresh air intake at extreme (very hot or very cold) outside environmental conditions to minimize the impact on indoor environmental conditions. A graphical illustration of a fresh air control portion of a single integrated central control unit 12 using both a humidifier 18C and a ventilator 18D is shown as FIG. 8.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A single integrated control for an HVAC system comprising:
   an indoor temperature sensor;
   an indoor relative humidity sensor;
   an outdoor temperature sensor;
   an indoor relative humidity sensor;
   a central control unit that operates in a heating mode and a cooling mode, wherein said central control unit is operable to receive inputs from said indoor temperature sensor, said indoor relative humidity sensor and said outdoor temperature sensor to manipulate an actual indoor temperature level, an actual indoor relative humidity level, and an actual indoor fresh air level during both a heating season and a cooling season; and
   a user interface operable for a user to input an at least one user desired indoor temperature, an at least one user desired indoor relative humidity, and a user desired indoor fresh air level, wherein said central control unit generated signals based upon said inputs to manipulate said actual indoor temperature level, said actual indoor relative humidity level, and said actual indoor, fresh air level to achieve said at least one user desired indoor temperature, said at least one user desired indoor relative humidity, and said use desired indoor fresh air level; and
   wherein when said central control operates in said cooling mode, said at least on user desired indoor temperature includes a user desired indoor cooling temperature, and said at least on user desired indoor relative humidity includes a user desired indoor relative cooling humidity, said actual indoor relative humidity level being increased when said actual indoor relative humidity level is lower than said user desired indoor relative cooling humidity.

2. The single integrated control as recited in claim 1 wherein when said central control operates in said heating mode, said at least one user desired indoor temperature includes a user desired indoor heating temperature, and said at least one user desired indoor relative humidity includes a user desired indoor relative heating humidity.

3. The single integrated control as recited in claim 2 wherein said actual indoor fresh air level is increased when said actual indoor relative humidity level is higher than said user desired indoor relative heating humidity.

4. The single integrated control as recited in claim 2 wherein said actual indoor fresh air level is decreased when said indoor relative humidity level is lower than said user desired indoor relative heating humidity.

5. The single integrated control as recited in claim 1 wherein said actual indoor relative humidity level is decreased when said actual indoor relative humidity level is higher than said cooling indoor relative humidity.

6. The single integrated control as recited in claim 1 wherein said central control unit manipulates said actual indoor temperature level, said actual indoor relative humidity level, and said actual indoor fresh air level by selectively activating and deactivating at least one device of an HVAC system.

7. The single integrated control as recited in claim 1 further including a user interface for entering a user input and wherein said central control receives at least one environmental input from a sensor, calculates an effective delta based upon said user input and said at least one environmental input, determines a maximum allowable indoor relative humidity based upon said effective delta, and adjusts said actual indoor relative humidity level to a value less than said maximum allowable indoor relative humidity.

8. The single integrated control as recited in claim 7 wherein said user input is representative of a building structure characteristic.

9. The single integrated control as recited in claim 7 wherein said user input is a user selectable humidity level.

10. An HVAC system comprising:
   a single integrated central control unit that operates in a heating mode and a cooling mode;
   a user interface operable for a user to input at least one user desired indoor environmental characteristic;
   a temperature control device;
   a humidity control device;
   a ventilator device; and
   a blower device, wherein said single integrated central control unit is operable to manipulate said temperature control device, said humidity control device, said ventilator device, and said blower device to achieve user desired settings during both a heating season and a cooling season, and wherein said single integrated central control unit controls said humidity control device to change an actual indoor humidity level to approach a desired indoor humidity level, wherein when said single integrated central control unit operates in said cooling mode, said at least one user desired indoor environmental characteristic includes a user desired indoor cooling temperature and a user desired indoor relative cooling humidity.

11. The HVAC system as recited in claim 10 wherein said actual indoor relative humidity level is decreased when said actual indoor relative humidity level is higher than said user desired indoor relative cooling humidity.

12. A method of controlling a HVAC system comprising the steps:
   inputting an at least one user desired indoor environmental characteristic into a single integrated central control;
   measuring an at least one actual environmental characteristic;
   transmitting said at least one actual environmental characteristic to said single integrated central control; and
   centrally controlling an at least one actual indoor environmental characteristic based upon said at least one user desired environmental characteristic and said at least one actual environmental characteristic during both a heating season and a cooling season, wherein an actual indoor fresh air level is increased when an actual indoor relative humidity is lower than a desired indoor relative humidity and where an outdoor temperature is above a predetermined temperature.

13. The method as recited in claim 12 further including the step of increasing an actual indoor fresh air level when an actual indoor relative humidity is higher than a desired indoor relative humidity and where an outdoor temperature is below a predetermined temperature.

14. The method as recited in claim 12 further including the step of decreasing an actual indoor fresh air level when an actual indoor relative humidity is lower than a desired indoor relative humidity and where an outdoor temperature is below a predetermined temperature.

15. A method or controlling an HVAC system comprising the steps of:
   inputting at least one user desired indoor environmental characteristic into a single integrated central control;
   measuring an at least one actual environmental characteristic;
   transmitting said at least actual environmental characteristic to said single integrated central control; and
   centrally controlling an at least one actual indoor environmental characteristic based upon said at least one user desired environmental characteristic and said at least one actual environmental characteristic during both a heating season and a cooling season, wherein an actual indoor fresh air level is decreased when an actual indoor relative humidity is higher than a desired indoor relative humidity and where an outdoor temperature is above a predetermined temperature.

16. The method as recited in claim 15 further including the step of increasing said actual indoor fresh air level when said actual indoor relative humidity is lower than said desired indoor relative humidity and where said outdoor temperature is above said predetermined temperature.

* * * * *